(12) United States Patent
Augenstein et al.

(10) Patent No.: US 9,091,576 B2
(45) Date of Patent: Jul. 28, 2015

(54) DEPLOYABLE ULTRASONIC FLOW METER THAT IS INSERTED THROUGH A GATE VALVE SLOT, METHOD AND APPARATUS

(71) Applicants: Donald R. Augenstein, Pittsburgh, PA (US); Jim Walsh, E. Falmouth, MA (US)

(72) Inventors: Donald R. Augenstein, Pittsburgh, PA (US); Jim Walsh, E. Falmouth, MA (US)

(73) Assignee: Cameron International Corporation, Houston, TX (US)

( * ) Notice: Subject to any disclaimer, the term of this patent is extended or adjusted under 35 U.S.C. 154(b) by 186 days.

(21) Appl. No.: 13/740,438

(22) Filed: Jan. 14, 2013

(65) Prior Publication Data
US 2014/0196547 A1    Jul. 17, 2014

(51) Int. Cl.
*G01F 1/66*      (2006.01)
*G01F 1/00*      (2006.01)

(52) U.S. Cl.
CPC .............. *G01F 1/667* (2013.01); *G01F 1/002* (2013.01)

(58) Field of Classification Search
CPC ....................................................... G01F 1/663
See application file for complete search history.

(56) References Cited

U.S. PATENT DOCUMENTS

| 5,342,144 | A  | * | 8/1994 | McCarthy ...................... 405/39 |
| 5,456,114 | A  | * | 10/1995 | Liu et al. ......................... 73/597 |
| 6,895,825 | B1 | * | 5/2005 | Barkhoudarian .......... 73/861.28 |
| 8,474,327 | B2 | * | 7/2013 | Aughton et al. ........... 73/861.28 |
| 2004/0009041 | A1 | * | 1/2004 | Aughton et al. ................ 405/99 |
| 2012/0144930 | A1 | * | 6/2012 | Aughton et al. ........... 73/861.28 |
| 2013/0239698 | A1 | * | 9/2013 | Aughton et al. ........... 73/861.28 |

FOREIGN PATENT DOCUMENTS

WO     WO2011020143     *  2/2011   ................ G01F 1/66

* cited by examiner

*Primary Examiner* — Harshad R Patel
(74) *Attorney, Agent, or Firm* — Ansel M. Schwartz (57) ABSTRACT

A frame that is inserted into a gate valve slot which accesses a channel through which fluid flows so an ultrasonic flowmeter can measure the fluid flow through the channel. The frame includes a first arm axle that fits into the slot. The frame includes a first ultrasonic transducer in communication with the flowmeter that is attached to the first arm axle. The frame includes a second ultrasonic transducer in communication with the flowmeter. The second transducer is aligned with and upstream from the first transducer relative to the fluid flow and between which ultrasonic signals are emitted and received through the fluid flow and which the flowmeter uses to determine the fluid flow through the channel. The apparatus for measuring fluid flow in a channel is accessed through a gate slot. A method for measuring fluid flow in a channel that is accessed through a gate slot.

12 Claims, 11 Drawing Sheets

DEPLOYABLE ULTRASONIC FLOW METER THAT IS INSERTED THROUGH A GATE VALVE SLOT, METHOD AND APPARATUS

FIELD OF THE INVENTION

The present invention is related to the measurement of fluid flow in a channel accessed with ultrasonic transducers through a gate valve slot (or "stop log" slots). (As used herein, references to the "present invention" or "invention" relate to exemplary embodiments and not necessarily to every embodiment encompassed by the appended claims.) More specifically, the present invention is related to the measurement of fluid flow in a channel accessed with ultrasonic transducers through a gate valve slot (subsequently referred to as a slot) where the ultrasonic transducers are deployable in the channel after being inserted through the gate valve slot.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Typical of ultrasonic flowmeters that are used in ASME PTC 18 flow measurements (e.g., performance tests for a hydroelectric plant), the plant is "shut down and dewatered" in order to install the ultrasonic transducers (referred to the transducers hereafter) into the flow conduit. The transducers are installed (typically attached to the inside of the conduit/pipe walls or through the conduit/pipe walls) using precise measurements. As such, the line is typically drained, closed and scaffolding is erected such that the transducers can be precisely mounted. Theodolites or other precise measuring equipment are used to make these measurements. The transducers must be well installed, while the measurement may be a one-time event—the installation must be permanent, since the cost of installation and removal is high.

For many hydroelectric plants—particularly those associated with a run of river flow, the ability to "shut down and dewater" the facility is difficult and expensive. The ability to secure a drained conduit/line can in itself be problematic since the cost of such an endeavor in and of itself can overwhelm the value of the measurement.

However, most hydroelectric plants will have gate valve slots (typically there will be two redundant slots) that provide for stop log insertions that are used to isolate the unit for dewatering and maintenance. This is true with most river hydroelectric plants. The present invention takes advantage of these slots.

BRIEF SUMMARY OF THE INVENTION

An apparatus, deployable frame and method involving the use of a deployment scheme for an ultrasonic flowmeter based upon time of flight principles. An array of transducers in communication with the flowmeter are inserted through a gate valve slot opening at a hydroelectric plant and then deployed to make the flow measurement.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Referring now to the drawings wherein like reference numerals refer to similar or identical parts throughout the several views, and more specifically to FIGS. 1a, 1b, 1c, 8, 9 and 10 there is shown a frame 12 that is inserted into a gate valve slot 14 which accesses a channel 16 through which fluid 18 flows so an ultrasonic flowmeter 20 can measure the fluid 18 flow through the channel 16. The frame 12 comprises a first arm axle 70 that fits into the slot 14. The frame 12 comprises a first ultrasonic transducer 24 in communication with the flowmeter 20 that is attached to the first arm axle 70. The frame 12 comprises a second ultrasonic transducer 26 in communication with the flowmeter 20. The second transducer 26 is aligned with and upstream from the first transducer 24 relative to the fluid 18 flow and between which ultrasonic signals are emitted and received through the fluid flow and which the flowmeter 20 uses to determine the fluid 18 flow through the channel 16. An ultrasonic flowmeter 20 that may be used is available from Cameron, 1000 McClaren Woods Drive, Coraopolis, Pa. 15108, as an example of such a flowmeter 20 that already exists in the industry. The operation of an ultrasonic flowmeter is well known.

The frame 12 may include a top post 28, right post 30 attached to the top post 28, and a left post 32 attached to the top post 28, and a bottom post 33 attached to the right and left posts. The frame 12 may include a second arm axle 72 and wherein the second transducer 26 is attached to the second arm axle 72. The first arm axle 70 may be disposed adjacent the left post 32 and the second arm axle 72 may be disposed adjacent the right post 30. The second transducer 26 may form an angle between 1 degree and 85 degrees upstream of the first transducer 24.

The second transducer 26 may be a fraction of the width of the channel upstream from the first transducer. The frame 12 may include a submersible motor 8 which moves the first arm axle 70 and second arm axle 72 to a deployed position, as shown in FIGS. 11-15. The frame 12 may include a first worm gear 78 attached to the first arm axle 70 and a second worm gear 80 attached to the second arm axle 72. The first and second worm gears are rotated by the motor 8. The frame 12 may include an axle gear 3 rotated by the motor 8, which rotates the first and second arm axles between the deployed and underemployed position through the first worm gear 78 and the second worm gear 80, respectively.

Figure 16:
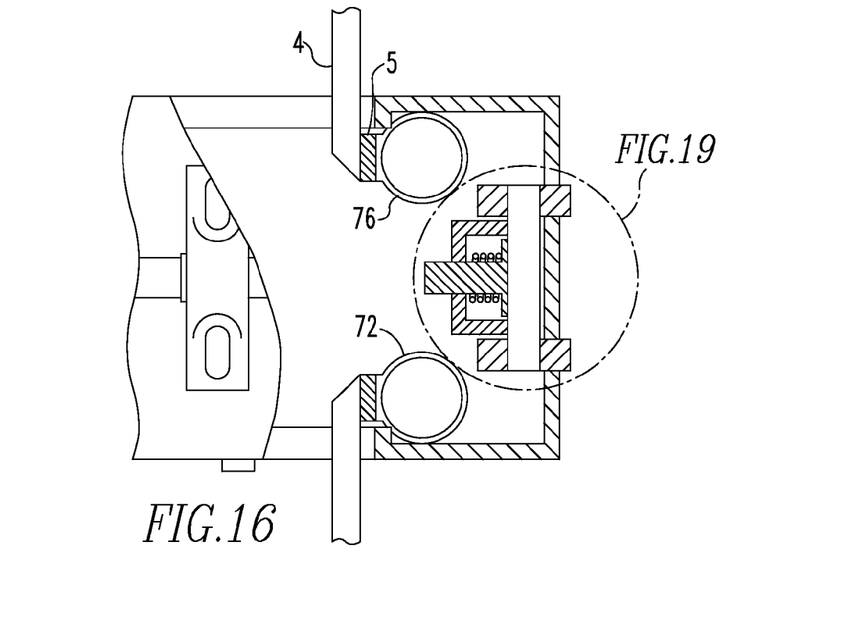
FIG. 16 is a sectional view of FIG. 12.
Figure 17:
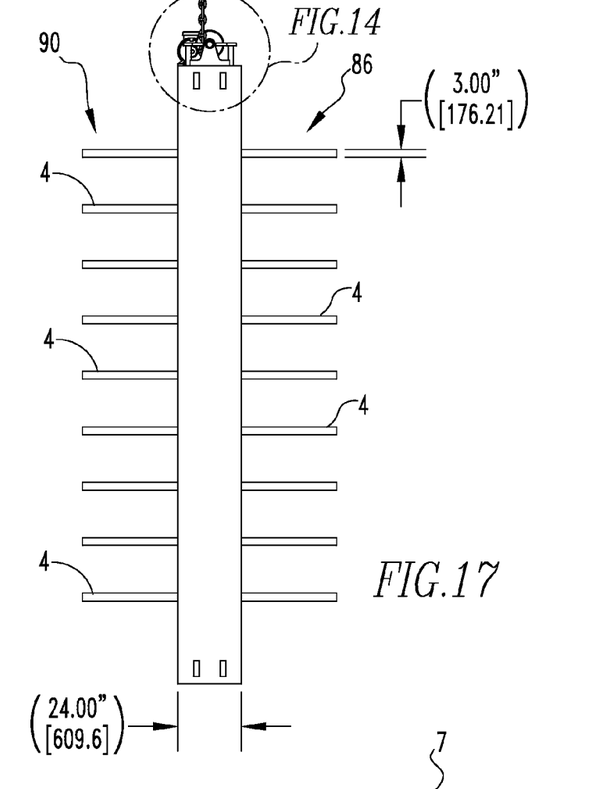
FIG. 17 is a side view of the frame.
Figure 18:
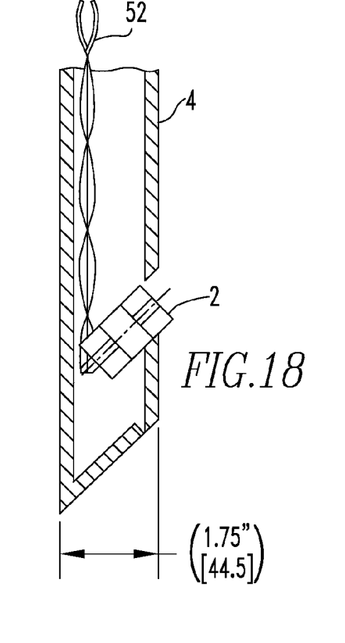
FIG. 18 is a sectional view of FIG. 12.

The frame 12 may include a motor gear 9 rotated by the motor 8 which rotates a drive gear 100 attached to the axle gear 3 to rotate the axle gear 3. The axle gear 3 is connected to the first worm gear 78 and second worm gear 80. The first arm axle 70 may have a plurality of transducer arms 4 extending from the first arm axle 70 as shown in FIGS. 16 and 17. Each of the plurality of transducer arms 4 has a transducer 2 and together form a first transducer array 86 which includes the first transducer 24; and the second arm axle 72 has a plurality of transducer arms 4 extending from the second arm axle 72. Each of the plurality of transducer arms 4 of the second arm axle 72 has a transducer 2 and together forms a second transducer array 88, which includes the second transducer 26. Each of the transducer arms is mounted to its respective axle arm with a mounting pad 5. Wiring 52 extends from each transducer 2 through its transducer arm 4, as shown in FIG. 18, through the arm axle to which it is a part, and to the flow meter 20.

Figure 19:
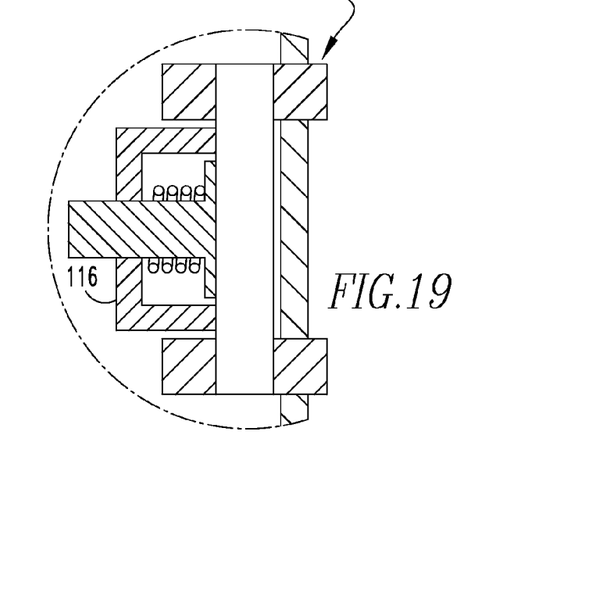
FIG. 19 is a sectional view of FIG. 16.

The frame 12 may include a third arm axle 74 disposed adjacent to and in parallel with the first arm axle 70. The third arm axle 74 has a plurality of transducer arms 4 extending from the third arm axle 74. Each of the plurality of transducer arms 4 of the third arm axle 74 having a transducer 2 and together forming a third transducer array 90; and including a fourth arm axle 76 disposed adjacent to and in parallel with the second arm axle 72. The fourth arm axle 76 having a plurality of transducer arms 4 extending from the fourth arm axle 76. Each of the plurality of transducers 2 of the fourth arm axle 76 having a transducer 2 and together forming a fourth transducer array 92. The frame 12 may include a third worm gear 82 connected to the axle gear 3 and the third arm axle 74 which rotates the third arm axle 74 when rotated by the motor 8; and a fourth worm gear 84 connected to the axle gear 3 and the fourth arm axle 76 which rotates the fourth arm axle 76 when rotated by the motor 8. Stabilizing rollers 7 and a spring loading assembly 116, as shown in FIGS. 16 and 19 are used on both sides of the top post 28, the right post 30 and the left post 32. The same is applicable for the bottom post 34.

Figure 1A:
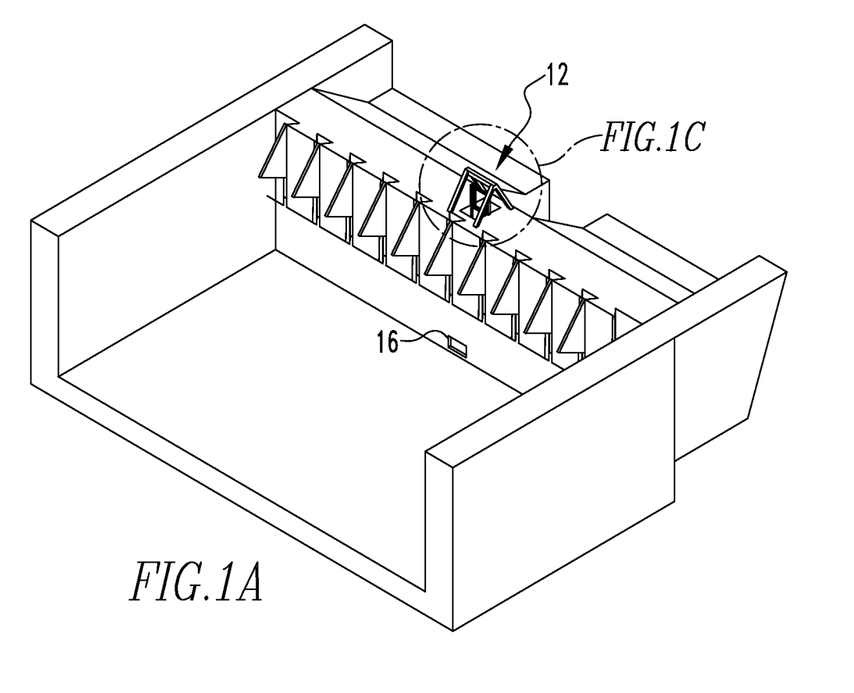
FIG. 1A is a perspective front view of a hydroelectric plant with the apparatus of the present invention.
Figure 1B:
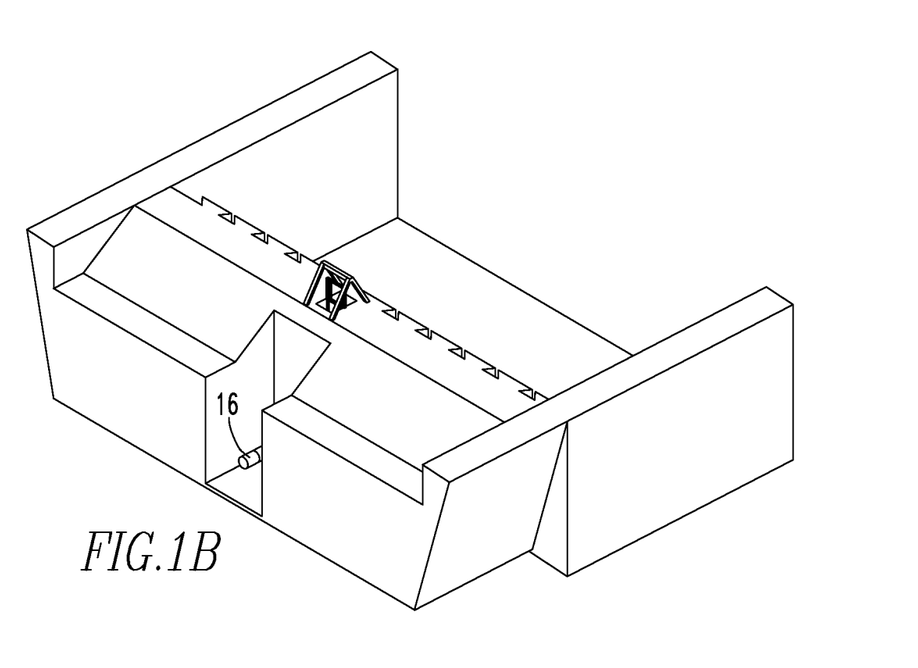
FIG. 1B is a rear perspective view of a hydroelectric plant with the apparatus.

FIG. 1A is a perspective front view of a hydroelectric plant with the apparatus of the present invention. FIG. 1B is a rear perspective view of a hydroelectric plant with the apparatus.

Figure 1C:
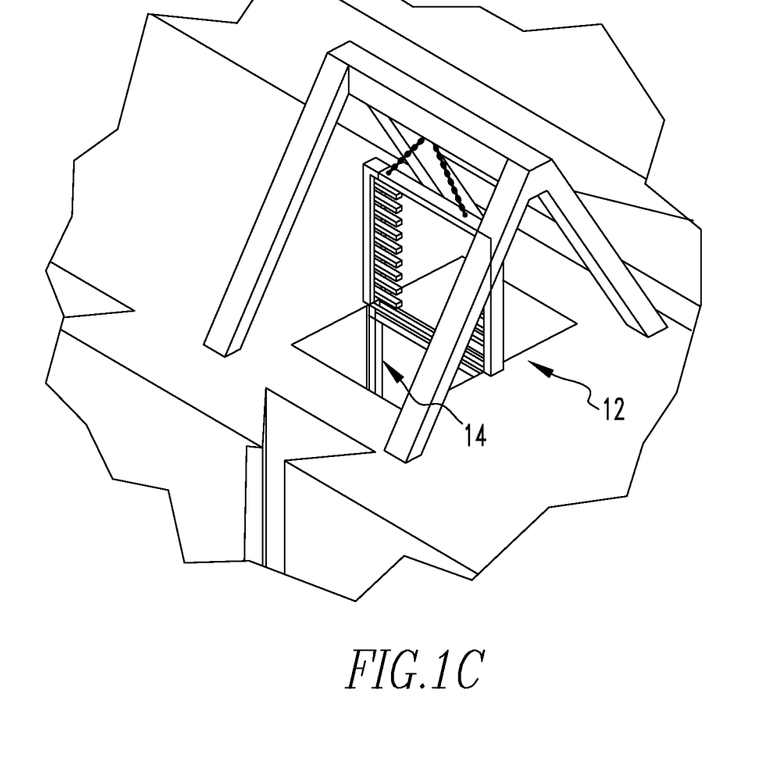
FIG. 1C is a perspective view of the apparatus positioned above a gate valve slot.

FIG. 1C is a perspective view of the apparatus positioned above a gate valve slot. From this position the frame is lowered down into the slot, for instance with a crane, and positioned in the channel where the motor 8 is activated to move the transducer arrays into a deployed position. In the undeployed position, where the frame is lowered down to the channel, the transducer arrays are positioned in parallel with the top and bottom posts so none of the transducer arms 4 will block the frame from moving down in the slot. Once in place, the frame 12 has its motor 8 activated which rotates the arm axles so the respective arrays move into the deployed position where the transducer arms 4 are now essentially in a perpendicular relationship with the top and bottom posts and signal paths for the ultrasonic signals between the transducers are formed between diagonally opposing transducer pairs. During deployment, the first and third arm axles rotate opposite each other, and the second and fourth arm axles rotate opposite each other.

Figure 8:
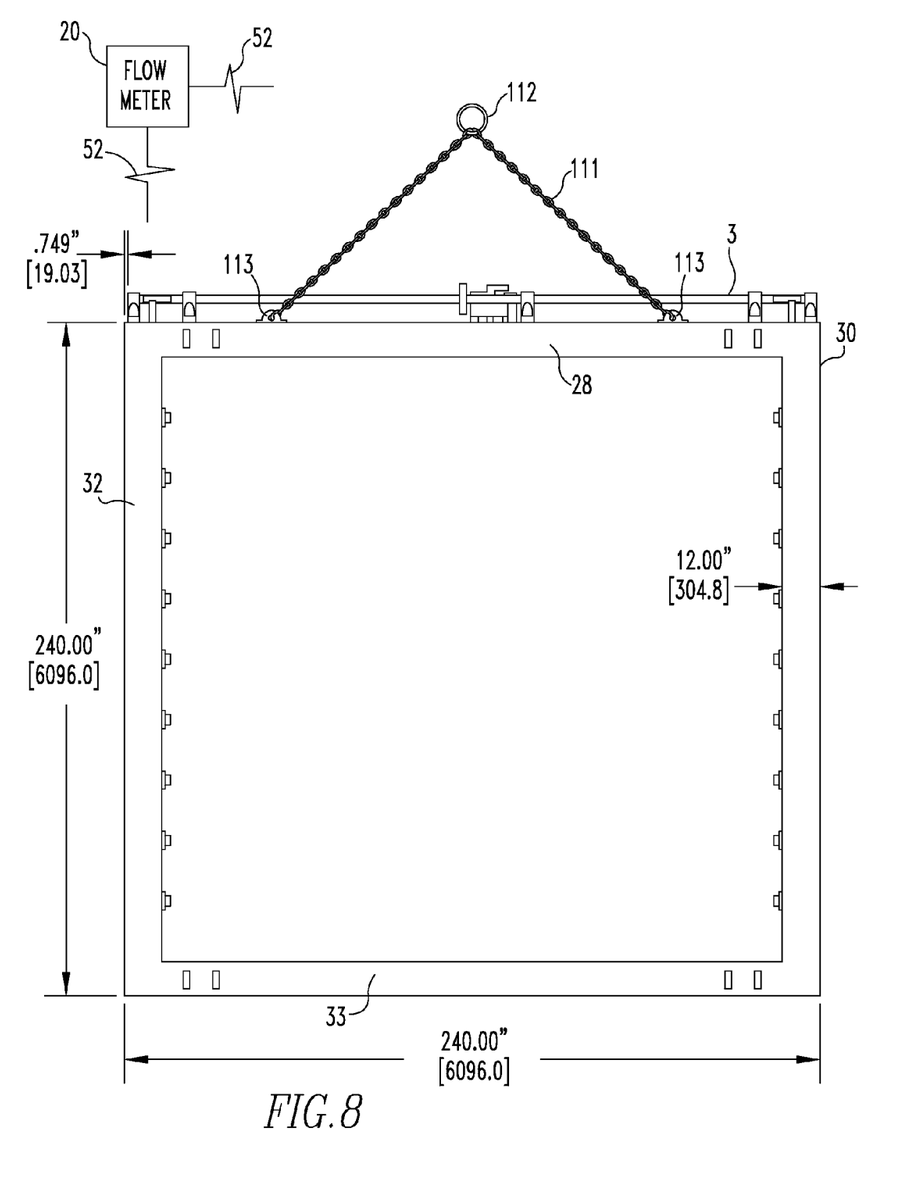
FIG. 8 is a front view of the frame of the present invention.
Figure 9:
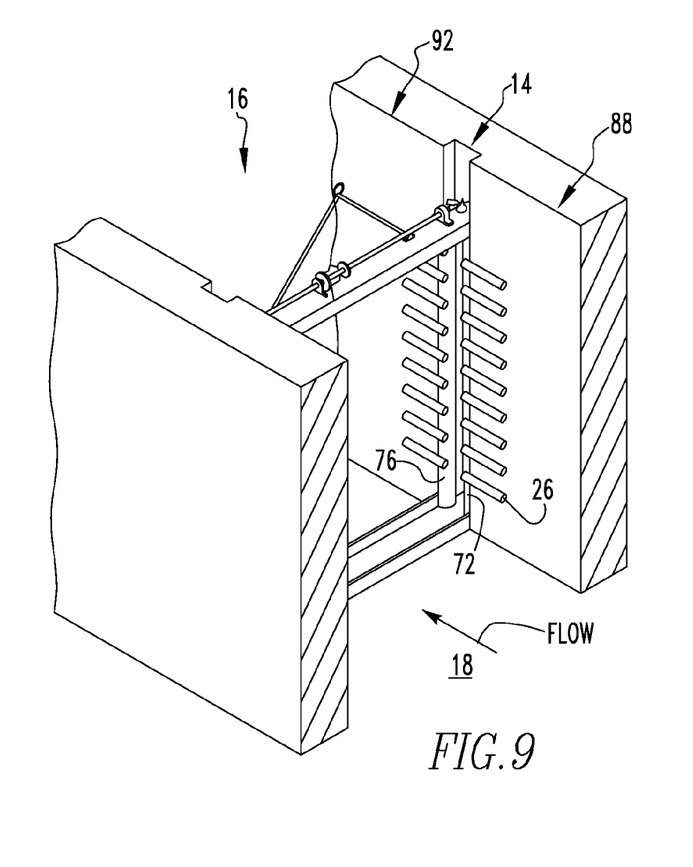
FIG. 9 is a perspective view of the frame inserted into a slot in a channel.
Figure 10:
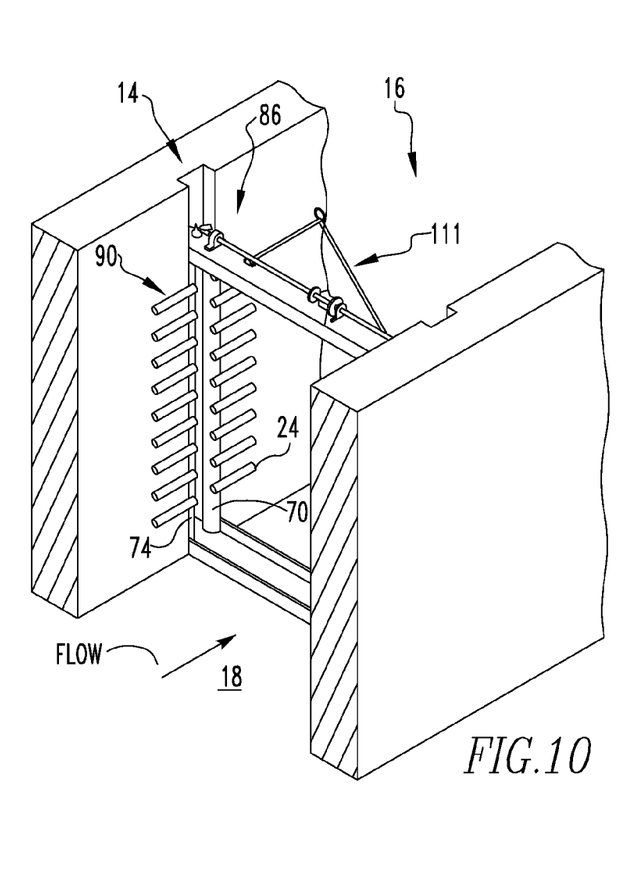
FIG. 10 is a perspective view of the frame inserted into a slot in a channel.
Figure 11:
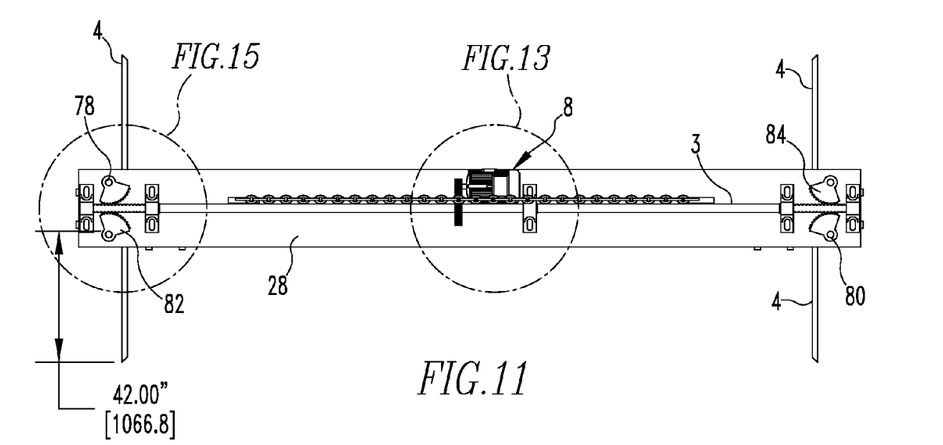
FIG. 11 is an overhead view of the frame.
Figure 12:
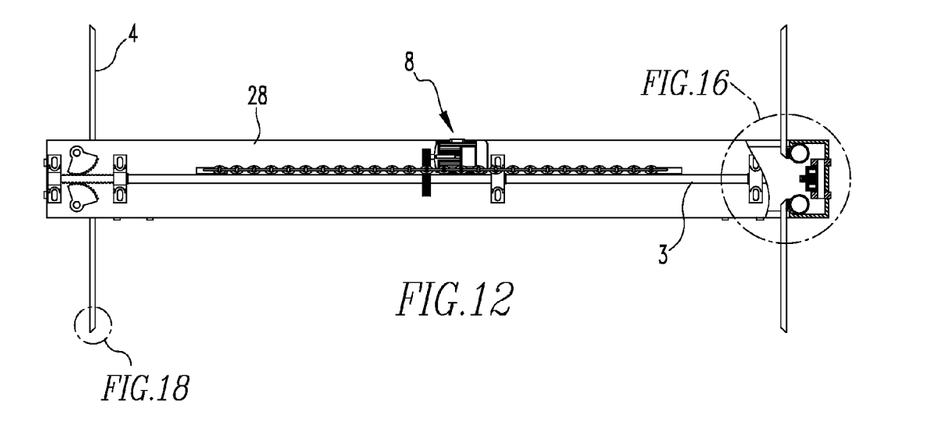
FIG. 12 is an overhead view of the frame.
Figure 13:
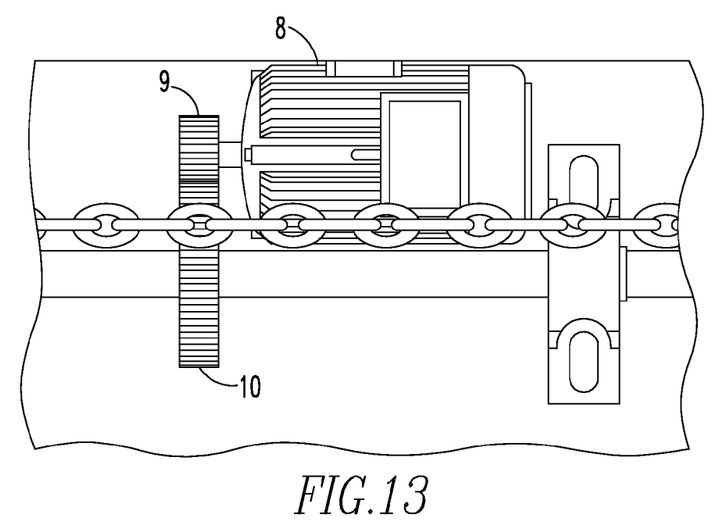
FIG. 13 shows the motor.
Figure 14:
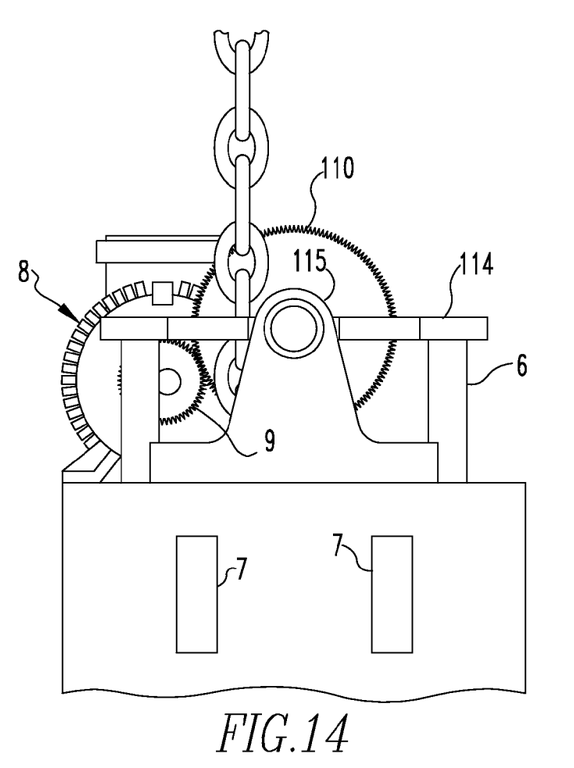
FIG. 14 is a sectional view of FIG. 17.
Figure 15:
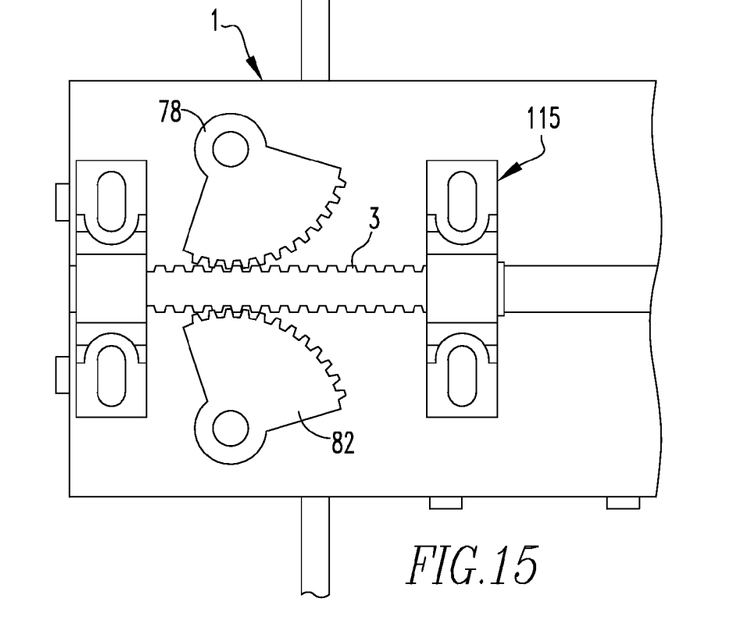
FIG. 15 is a sectional view of FIG. 11.

FIG. 8 is a front view of the frame of the present invention. FIG. 9 is a perspective view of the frame inserted into a slot in a channel showing the arrays in a deployed position. FIG. 10 is a perspective view of the frame inserted into a slot in a channel showing the arrays in a deployed position.

In another embodiment, and with reference to FIGS. 1-7 thereof, there is shown a gate slot 14 and a frame 12 that is inserted into a gate slot 14 which accesses a channel 16 through which fluid 18 flows so an ultrasonic flowmeter 20 can measure the fluid 18 flow through the channel 16. The frame 12 comprises a first bar 22 that fits into the slot 14. The frame 12 comprises a first ultrasonic transducer in communication with the flowmeter 20 that is attached to the first bar 22. The frame 12 comprises a second ultrasonic transducer 26 in communication with the flowmeter 20. The second transducer 26 is aligned with and upstream from the first transducer 24 relative to the fluid 18 flow and between which ultrasonic signals are emitted and received through the fluid 18 flow and which the flowmeter 20 uses to determine the fluid 18 flow through the channel 16.

Figure 2:
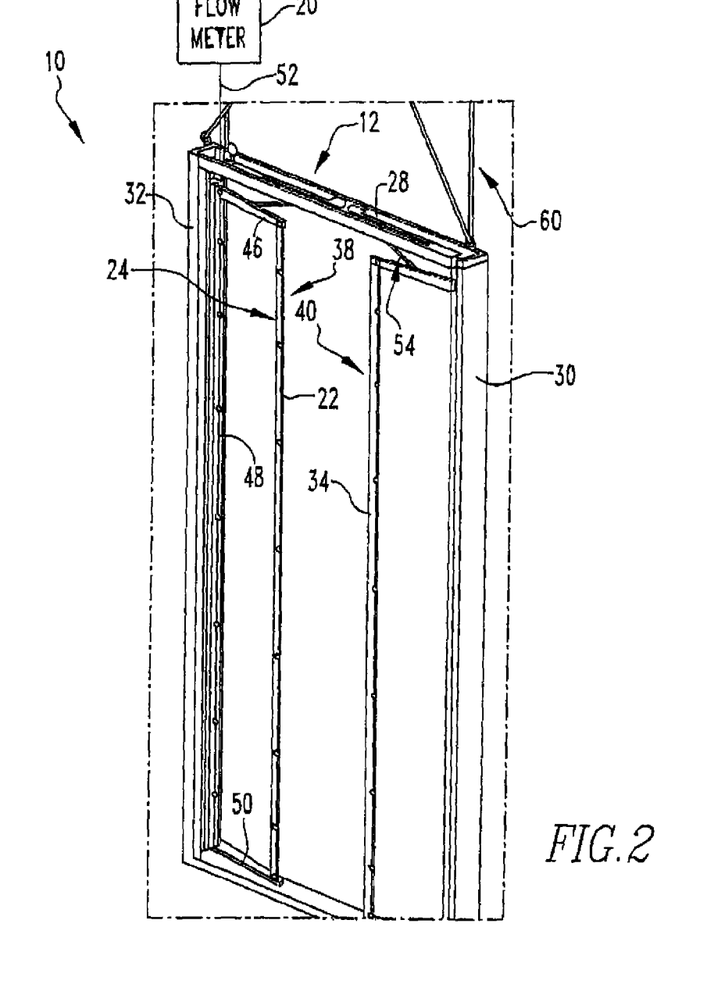
FIG. 2 is a perspective side view that shows a gate slot frame of the present invention.

The frame 12 may include a top post 28, right post 30 attached to the top post 28, and a left post 32 attached to the top post 28, as shown in FIG. 2. The second transducer 26 may be attached to the right post 30. The first bar 22 may be attached to the left post 32. The second transducer 26 may form an angle between 1 degree and 85 degrees upstream of the first transducer 24. The second transducer 26 may be only 3% of the channel's width upstream of the first transducer 24. The frame 12 may include a second bar 34 attached to the right post 30, and a third ultrasonic transducer attached to the second bar 34 and attached to the right post 30 through the second bar 34.

The first bar 22 may be part of a first transducer frame 38, the first bar can pivot and is attached to the left post 32; and wherein the second bar 34 may be part of a second transducer frame 40, the second bar can pivot and is attached to the right post 30, and the frame 12 may include at least a fourth ultrasonic transducer 42 attached to the right post 30. The third transducer 36 may be aligned with and downstream from the fourth transducer 42. The frame 12 may include a first actuator 44 attached to the first transducer frame 38 to move the first transducer frame 38. The first transducer frame 38 may have a third bar 46 that extends from the first post and which is attached to the first bar 22.

The actuator may be attached to the third bar 46. The first transducer frame 38 may include a fourth bar 48 that can pivot and is attached to the first post, and to the third bar 46. The third transducer 36 may be attached to the fourth bar 48. The first transducer frame 38 may include a fifth bar 50 attached to the first and fourth bars 22, 48. The first and fourth bars 22, 48 may be essentially in parallel. The third and fifth bars 46, 50 may be essentially in parallel and the first and third and fourth and fifth bars 22, 46, 48, 50, respectively, may form a rhombohedrum shape. The frame 12 may include wiring 52 attached to the first and third transducers 24, 36 and connected to the flowmeter 20.

Figure 3:
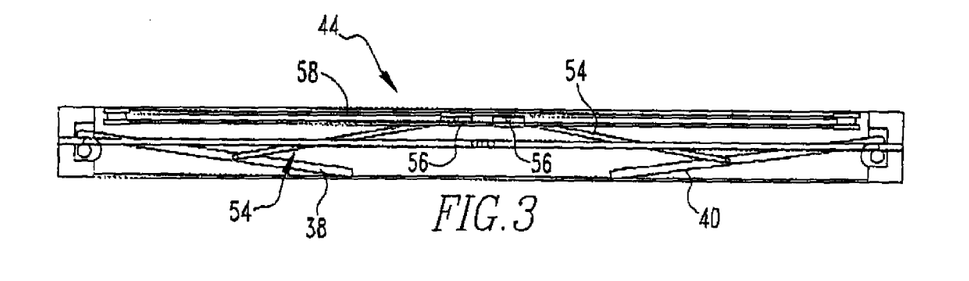
FIG. 3 is an overhead view of a gate slot frame of the present invention with the transducers in the undeployed state.

The actuator may include an actuator bar 54 that is attached to the third bar 46, and a stem 56 attached to the actuator bar 54 and slidably attached to the top post 28, as shown in FIGS. 2 and 3. The top post 28 may have a slot 58 in which the stem 56 is disposed along which the stem 56 moves to move the actuator which moves the first transducer frame 38 between an undeployed position, where the first transducer frame 38 is essentially parallel with the top post 28, to a deployed position, where the first transducer frame 38 extends essentially perpendicular with the top post 28.

The present invention pertains to an apparatus 10 for measuring fluid 18 flow in a channel 16 that is accessed through a gate slot 14. The apparatus 10 comprises an ultrasonic flowmeter 20. The apparatus 10 comprises a gate slot frame 12 that is disposed in the gate slot 14. The frame 12 has a first ultrasonic transducer in communication with the flowmeter 20, and a second ultrasonic transducer in communication with the flowmeter 20. The second transducer 26 is aligned with and upstream from the first transducer 24 relative to the fluid 18 flow and between which ultrasonic signals are emitted and received through the fluid 18 flow and which the flowmeter 20 uses to determine the fluid 18 flow through the channel 16.

The present invention pertains to a method for measuring fluid 18 flow in a channel 16 that is accessed through a gate slot 14. The method comprises the steps of moving a first transducer array having a first ultrasonic transducer disposed in the channel 16 from an undeployed state to a deployed state. There is the step of moving a second transducer array having a second ultrasonic transducer disposed in the channel 16 from an undeployed state to a deployed state so the second transducer 26 is aligned with and upstream from the first transducer 24 relative to the fluid 18 flow. There is the step of transmitting and receiving ultrasonic signals through the fluid 18 flow between the first and second transducers 24, 26. There is the step of determining with an ultrasonic flowmeter 20 connected to the first and second transducers 24, 26 from the ultrasonic signals the fluid 18 flow in the channel 16.

In the operation of the invention, a frame 12 is constructed that uses valve slots to deploy acoustic transducers for transit time flow measurements without dewatering the unit. FIG. 1 is a photo of the gate slot 14 frame 12 that can be installed into a hydroelectric plant.

The frame 12 can be inserted into these preexisting gate slots 14 at each unit at the plant and as seen above, there is an access port/opening available at each intake to the unit at the plant so that this frame 12 can be inserted. The present invention uses the gate slot access port and attaches to the frame 12 a transducer array for flow measurement. For time of flight ultrasonic meters, there is an axial length between the transducers for the best accuracy. The width of the gate valve array is typically too narrow to provide an accurate measurement; therefore, in such instances, it is desired for the array to deploy to improve the accuracy of measurement.

Using the frame 12, the transducer deployment array can be designed to provide precise dimensions, a known hydraulic geometry and the ability to use an existing entry point so that the customer can have an accurate measurement at a reasonable cost. Additionally, this frame 12 can be moved between units at the plant in order to make discharge/performance measurements at all the units in the plant. The cost of the frame 12 can be amortized over the number of units and potential measurements.

The deployment of the transducers is illustrated in FIG. 2. FIG. 2 shows the gate valve frame 12. Control cables 60 are attached to the top post 28 to raise and lower the frame 12. The first transducer frame 38 is pivotally connected to the left post 32, for instance with hinges, and the second transducer frame 40 is pivotally attached to the right post 30. Each of the transducer frames have transducers installed into the frames.

Figure 4:
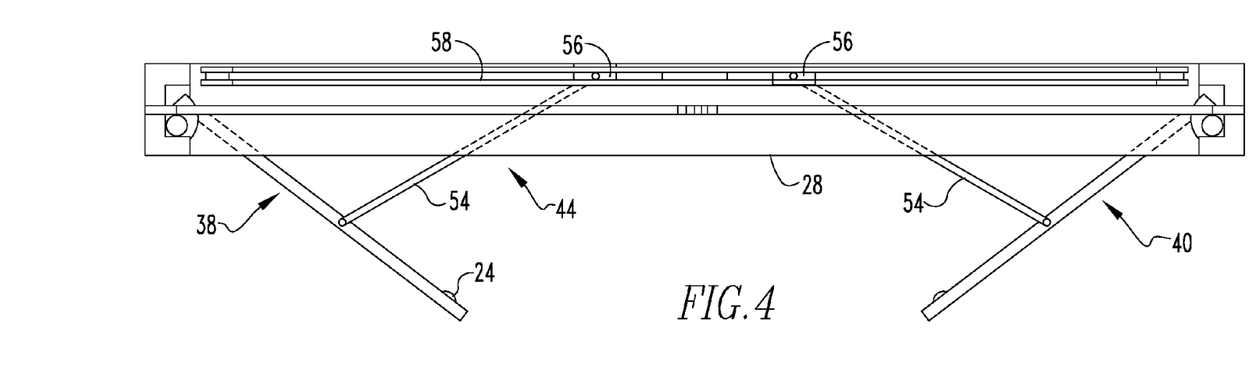
FIG. 4 is an overhead view of the transducers partially deployed.
Figure 5:
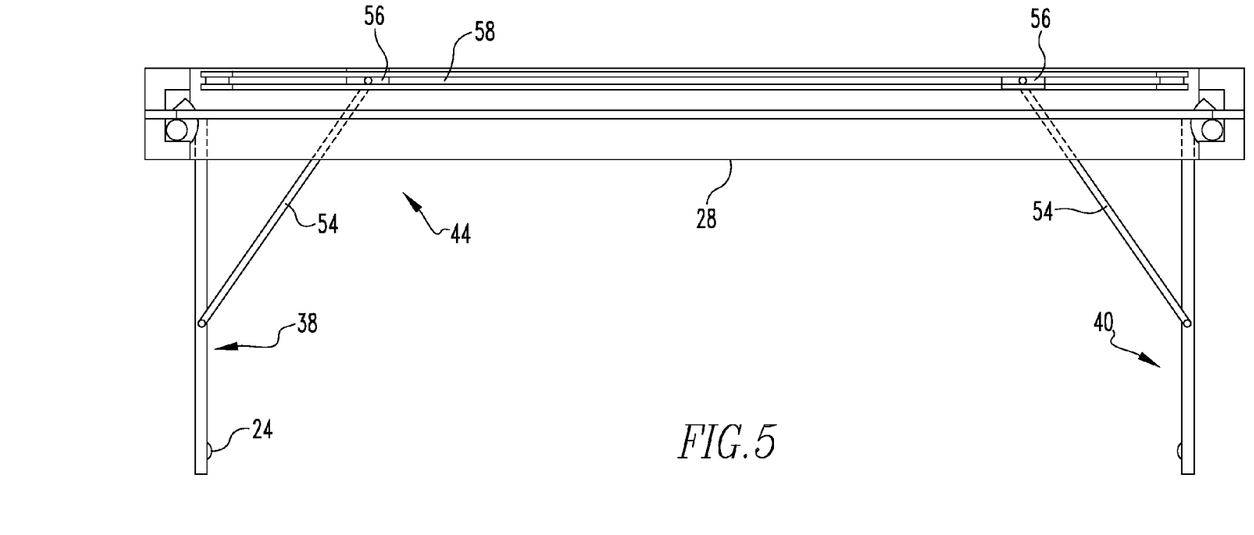
FIG. 5 is an overhead view of the transducers fully deployed.
Figure 6:
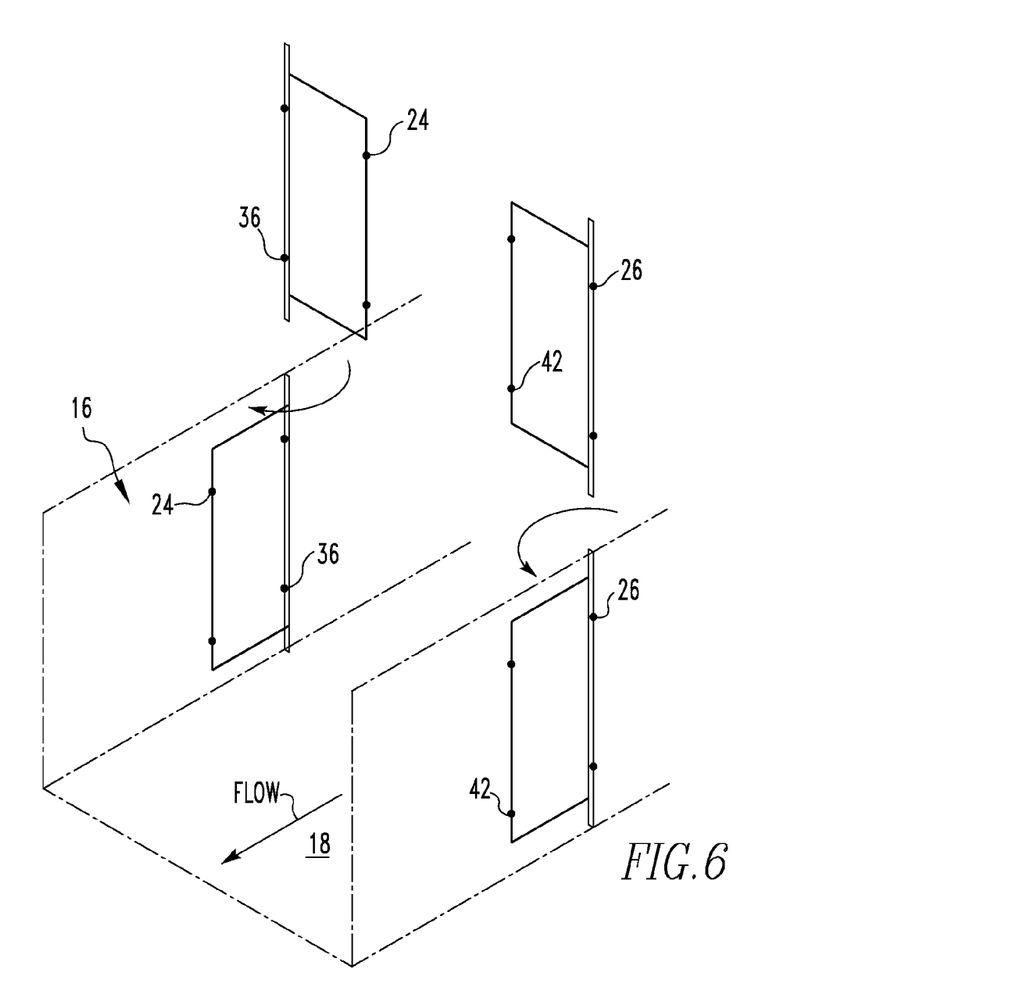
FIG. 6 shows the transducer frames in an undeployed and deployed state.
Figure 7:
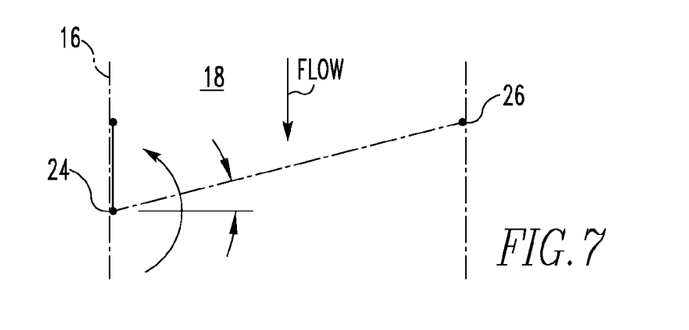
FIG. 7 is a top view which shows the transducer frames in a deployed state.

There is an actuator bar 54 attached to a stem 56 and attached to the first transducer frame 38. The stem 56 is positioned in a slot 58 in the top post 28, as shown in FIG. 3. As the stem 56 is moved along the slot 58 toward the left post 32, the actuator bar 54 is moved and pushes against the first transducer frame 38, causing the first transducer frame 38 to pivot about the left post 32 and move out from under the top post 28, as shown in FIG. 4. The stem 56 is continued to be moved along the slot 58 to the left post 32 until the first transducer frame 38 essentially extends perpendicular from the top post 28. To return the first transducer frame 38 to the undeployed position where it is essentially in parallel with and under the top post 28, the stem 56 moves along a slot 58 away from the left post 32 towards the center of the top post 28. The same action described above for the deployment of the first transducer frame 38 is also applicable to the second transducer frame 40 in regard to the stem 56 and actuator bar 54 attached to the second transducer frame 40, except that in regard to the second transducer frame 40, its stem 56 moves toward the right post 30 for deployment and back to the center away from the right post 30 for the second transducer frame 40 to be positioned back in the undeployed state.

The sides of the hydroelectric plant's conduits are not shown in FIGS. 2-5, but the deployed transducer array in the transducer frames are flush up the sides.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A frame that is inserted into a gate valve slot which accesses a channel through which fluid flows so an ultrasonic flowmeter can measure the fluid flow through the channel, the frame comprises:
    a first arm axle that fits into the slot and is disposed in the channel;
    a first ultrasonic transducer in communication with the flowmeter that is attached to the first arm axle and is disposed in the channel;
    a second arm axle that fits into the slot and is disposed in the channel;
    a second ultrasonic transducer in communication with the flowmeter that is attached to the second arm axle and disposed in the channel, the second transducer aligned with and upstream from the first transducer relative to the fluid flow and between which ultrasonic signals are emitted and received through the fluid flow and which the flowmeter uses to determine the fluid flow through the channel;
    a top post, right post disposed in the channel and attached to the top post, and a left post disposed in the channel and attached to the top post, the first arm axle is disposed adjacent to the left post and the second arm axle is disposed adjacent to the right post; and
    cross wires attached to the top post to raise and lower the frame from and into the channel, respectively, the frame hanging from the cross wires in the channel.

2. The frame of claim 1 wherein the second transducer forms an angle between 1 degree and 85 degrees upstream of the first transducer.

3. The frame of claim 2 wherein the second transducer is a fraction of the width of the channel upstream from the first transducer.

4. The frame of claim 3 including a motor which moves the first arm axle and second arm axle to a deployed position.

5. The frame of claim 4 including a first worm gear attached to the first arm axle and a second worm gear attached to the second arm axle, the first and second worm gears rotated by the motor.

6. The frame of claim 5 including an axle gear rotated by the motor, which rotates the first and second arm axle between the deployed and underemployed position through the first worm gear and the second worm gear, respectively.

7. The frame of claim 6 including a motor gear rotated by the motor which rotates a drive gear attached to the axle gear to rotate the axle gear, the axle gear connected to the first and second worm gears.

8. The frame of claim 7 wherein the first arm axle having a plurality of transducer arms extending from the first arm axle, each of the plurality of transducer arms having a transducer and together forming a first transducer array which includes the first transducer, and the second arm axle having a plurality of transducer arms extending from the second arm axle, each of the plurality of transducer arms of the second arm axle having a transducer and together forming a second transducer array, which includes the second transducer.

9. The frame of claim 8 including a third arm axle disposed adjacent to and in parallel with the first arm axle, the third arm axle having a plurality of transducer arms extending from the third arm axle, each of the plurality of transducer arms of the third arm axle having a transducer and together forming a third transducer array; and including a fourth arm axle disposed adjacent to and in parallel with the second arm axle, the fourth arm axle having a plurality of transducer arms extending from the fourth arm axle, each of the plurality of transducers of the fourth arm axle having a transducer and together forming a fourth transducer array.

10. The frame of claim 9 including a third worm gear connected to the axle gear and the third arm axle which rotates the third arm axle when rotated by the motor; and a fourth worm gear connected to the axle gear and the fourth arm axle which rotates the fourth arm axle when rotated by the motor.

11. An apparatus for measuring fluid flow in a channel that is accessed through a gate slot comprises:
   an ultrasonic flowmeter; and
   a gate slot frame that is disposed in the gate slot and in the channel, the frame having a first ultrasonic transducer disposed in the channel and in communication with the flowmeter, and a second ultrasonic transducer disposed in the channel and in communication with the flowmeter, the second transducer aligned with and upstream from the first transducer relative to the fluid flow and between which ultrasonic signals are emitted and received through the fluid flow and which the flowmeter uses to determine the fluid flow through the channel.

12. A method for measuring fluid flow in a channel that is accessed through a gate slot comprises the steps of:
   moving a first transducer array having a first ultrasonic transducer disposed in the channel from an undeployed state to a deployed state;
   moving a second transducer array having a second ultrasonic transducer disposed in the channel from an undeployed state to a deployed state so the second transducer is aligned with and upstream from the first transducer relative to the fluid flow;
   transmitting and receiving ultrasonic signals through the fluid flow between the first and second transducers; and
   determining with an ultrasonic flowmeter connected to the first and second transducers from the ultrasonic signals the fluid flow in the channel.

\* \* \* \* \*